Patented Sept. 29, 1936

2,055,878

UNITED STATES PATENT OFFICE 2,055,878

SELF-FLUXING SOLDER AND METHOD FOR MAKING SAME

Sidney L. Palmer and Lloyd M. Beckes, San Francisco, Calif., assignors to Federated Metals Corporation, New York, N. Y., a corporation of Delaware Application July 16, 1934, Serial No. 735,348

9 Claims. (Cl. 113—110)

This invention relates to improved sealed flux-core solder tubing, improved seals and closures therefor, and to processes and apparatus for producing same. The invention is principally directed to end closures and end sealing of flux-core solder tubing, but its teachings are applicable also to longitudinally spaced closures intercluding the flux core intermediate the ends of the tubing. The invention is not limited to the more common forms of flux-core solder tubing such as flux-core solder wire, but is applicable as well to tubing of heavier sections, of various longitudinal and transverse shapes and with plural as well as single flux cores. The invention is well suited to very short lengths of flux-core tubing, which when sealed at each end constitute flux-core solder pellets. After these short lengths have been sealed they can be rolled into spherical shaped pellets or pressed cold into other shapes as desired.

Objects of this invention are to provide an improved sealed self-fluxing solder, improved forms of seal therefor and improved processes for producing the same. Certain of the desirable improvements which this invention purposes to attain are, more liquid-tight and air-tight sealing, a stronger and more durable seal, and one which is more durably hermetic, a more compact seal which interrupts the flux-core for a minimum distance and which in other ways avoids detrimentally affecting the product. Other objects are to attain improved appearance of seal, minimum time and cost, and maximum efficiency in sealing. It is further an object of this invention to provide a seal and methods of and apparatus for effectively and efficiently sealing types of flux-core solder which were not well adapted to previous seals, sealing methods and apparatus. It is a further object of this invention to teach an improved method of joining separate pieces of solder tubing together or to other objects as desired. Other and ancillary objects of the invention will be suggested by the following description and in the use and practice of the invention.

Referring to the drawing:

Figures 1, 4, 5 and 6 are longitudinal sections of portions of flux-core solder tubing in process of being hermetically sealed. These figures depict differing methods of sealing and illustrate forms of apparatus for sealing. Figures 1, 5 and 6 are views immediately prior to the step of hermetically sealing, and Figure 4 immediately subsequent thereto.

Figures 2, 3 and 7 are longitudinal sections of short lengths of hermetically sealed flux-core solder tubing showing differing types of seals.

This invention will be described as applied to the most common commercial forms of self-fluxing solder consisting of a tube or hollow wire 2 having its bore filled with a flux-core of rosin, zinc chloride solution, or any other suitable soldering flux. Especially with liquid flux-cores, and to a lesser degree with solid or paste flux-cores, it is desirable to seal the ends of the solder tubing to prevent leakage of flux out of and air into the solder core. The sealed flux-core solder tubing may at times develop very substantial internal pressures, to which the end seal must be resistant. It is important also that the end seal be innocuous to the solder. This invention in preferred form, contemplates formation of such an end seal by melting the end of the solder tube closed. Our efforts to melt the tube closed, even by methods so complicated as to be commercially impractical, were unsuccessful prior to this invention. This invention discloses an ingeniously simple yet consistently operative technique for thus adherently and integrally bonding the solder tube closed.

In simplest terms and apart from progressive improvements and refinements, the invention consists of first isolating the flux-core from the portion of solder tubing to be sealed, and thereafter adherently bonding the tubing closed as by welding or soldering.

It is emphasized that the flux-core is isolated from the portion of tubing to be sealed prior to soldering; and this prescription is set forth with full knowledge of and in defiance to precedent which dictates that soldering flux should be an aid to and customarily should not be isolated from a joint to be soldered.

In the practice of this invention, the flux-core solder tubing 2 with its core 4 to be sealed is gripped near its end firmly between a pair of plier jaws 6, 6' or other suitable pressure-exerting means, as shown in Fig. 1, and is maintained under pressure sufficient to collapse the walls of the solder tube into metal to metal contact, thus closing the bore of the tube. While maintaining this same gripping pressure on the solder tube, the projecting end thereof is heated by any suitable means, as for example by touching with a hot soldering iron 8 until the tip end of tubing melts and seals the tube.

In the case of tubular solder having a core of a solid flux such as rosin, no practicable amount of pressure will bring the walls of the tubing into metal-to-metal contact until the solder tube is heated as for example by application of the soldering iron to the end of the tube; at which time, however, the operations of collapsing the walls of the tubing and hermetically sealing the end thereof take place almost conjointly.

Pressure of the jaws 6, 6', in collapsing the walls of the solder tube into metal-to-metal contact, expels flux from the end portion of the tube, leaving a fluxless length of the tube adjacent the end to be soldered and thereby isolating the flux-core from the tip portion of the tube to be sealed. Collapsing the walls of the tube into metal-to-metal contact moreover solidly closes the tube and thereby still more positively isolates the flux-core. In addition, the jaws 6, 6', being preferably of metal, serve to abstract heat by conduction from the solder tube adjacent to the portion being soldered; thereby reducing transmission of heat back into the flux-core. Thus the flux-core is isolated thermally as well as mechanically, from the end of the tube to which heat is applied. If desired, the jaws 6, 6' could be water cooled, or a liquid coolant could be applied directly to the solder tube as by immersing the tube in water with only its end portion projecting above the surface. As a still further means for reducing transmission of heat back into the solder tube, the end can be melted closed by a highly localized high temperature short duration surge of current with an electric arc similar to that subsequently described and illustrated in Fig. 5 herein. While the several cumulative component steps of isolating the flux-core are performed in a concise single operation, they are nevertheless separable and individually effective to that purpose. To cite only one example, experiment has shown that satisfactory results are attainable when the plier jaws are of non-conductive material and no effort is made to abstract heat from the solder tubing nor to highly localize or shorten the duration of heat application.

End seals formed as aforedescribed are illustrated in Fig. 2. Each consists of a tip closure 2A adherently bonded to and hermetically bonding the tube 2 closed. The tip 2A, having been formed from the tubing, has a composition and melting point identical thereto. While it is decidedly preferable to form the tip 2A by melting the solder tubing itself, it is recognized that a piece or drop of solder or other adherent material from an outside source may be applied to the end of the solder tubing in any desired manner. It is highly preferable to solder the tip 2A because of the integral character of adherence resulting. The more nearly the tip 2A corresponds in composition and melting point to that of the solder tubing, the more desirable is the result.

Preferably, the end of the solder tube is melted back into the space between jaws 6, 6'; i. e., down to the collapsed portion of tubing having its walls in metal-to-metal contact. The effect is to heat and weld the contacting walls into integral union in addition to sealing the extreme end with a tip of solder. The end seal so formed is illustrated in Fig. 3 wherein, in addition to the tip 2A and contacting walls 2B shown in Fig. 2, there is a portion 2C therebetween, where the contacting walls are welded to integral union. It is possible in this embodiment to carry the application of heat back until no unwelded contacting portion of wall 2B remains, but it is customary not to carry the heating process back to this extent.

As indicated in Fig. 3, there need be no clear line of demarcation between the soldered tip 2A and the adjacent welded closure 2C. Preferably both are formed in a single operation and merge imperceptibly into each other. It should be emphasized however that the closures 2A and 2C each can be formed separately without the other, and either one alone without the other may be employed to seal the end of the tube. The combination of the two is uniquely desirable, but not essential. Fig. 2 illustrates solder tubing sealed with tip closures 2A having no welded closure 2C associated therewith. The welded joint 2C alone without an associated tip 2A will be described subsequently together with a method and means for forming the same.

It is desirable, but not essential when gripping the solder tube between jaws 6, 6', to leave the tip of the solder tube extending beyond the jaws. The tip of the solder tubing can instead, be flush with or inset from the edges of jaws 6, 6' and can be melted by the point or edge of a thin soldering iron.

It is desirable, but not essential completely to liquefy the tip of the solder tubing. The contacting walls of the collapsed portion of tubing may instead be brought merely up to hot-welding temperature. Thus for example as shown in Fig. 4, the jaws 8, 8' of pliers or press may both be made of insulating material with an inlaid flush pair of opposed blocks 10, 10' of metal, one in the face of each jaw. The metal blocks 10 and 10' are connected in series through a switch 12 to a source 14 of high amperage current. Current from a standard one hundred and ten volt circuit is satisfactory if a resistance be connected in series therewith. When the jaws are pressed tightly on the solder tubing, switch 12 is closed for an instant to send a surge of heating current from block 10 through the collapsed solder tubing, to block 10'. The amperage and its duration of passage are controlled to heat the contacting walls of the solder tubing to welding temperature without melting them. The end-seal formed without liquefying the solder is illustrated in Fig. 4. The end tip 2A characteristic of the aforedescribed end-seals is absent, and there remains only the unwelded portion of contacting walls 2B and the portion 2C where the contacting walls are welded into integral union. It would be possible to omit the unwelded portion 2B by carrying the metal blocks 10, 10' out to the edges of the jaws, but it is preferable not to do so.

Though shorter more compact end-seals can be formed with greatest consistency and reliability by the aforedescribed methods, it has nevertheless been found possible to seal the solder tubing by the alternative method next to be described. The solder tube is pinched as aforedescribed to collapse its walls into metal-to-metal contact, though it is desirable to collapse a somewhat greater length of tubing than aforedescribed. The tubing is then removed from the plier or other pinching means and is not maintained under pressure while the end of the tube is heated as before until it melts and closes the bore of the tube; and it is similarly desirable to melt the solder back to the flattened portion of the tube if the flattened portion does not extend clear to the end of the tube. The entire flattened portion of the tube should not be melted away however. A portion of the tube should be left with its walls collapsed into metal to metal contact adjacent to the soldered end of the tube. In applying this modified method to rosin or other solid flux-core solder, the end portion of the tubing should be heated before or while being pinched to a temperature at least sufficient to soften the flux, and preferably high enough completely to liquefy the normally solid flux. As before, it is preferable but not essential to form the tip seal by melting the tube itself instead of supplying solder from an outside source.

The flux-core solder is commonly manufactured in a continuous wire or tube which must be cut into merchandizable lengths. As a further development of the aforedescribed invention, it is found that the solder tubing may be cut and each end so formed be soldered in a single operation. The tubing before being cut is pinched as before, but not near the end thereof, and preferably a still greater length of tubing is collapsed into metal to metal contact than in either of the methods aforedescribed. The tubing is then heated at the middle of the collapsed length, as by application of the edge of a soldering iron or an electric arc thereto, until the tubing melts in two; thus simultaneously severing the tubing and sealing both severed ends.

The preferred apparatus for accomplishing the last-described development of my invention is shown in Fig. 5. A mating pair of steel rolls 16, 16', driven by a suitable source of power not shown, are provided through which the solder tubing is drawn. Normally, the rolls do not exert sufficient pressure to collapse the tubing, but the upper roll can be pressed down to collapse any desired length of tubing, by means of a foot-treadle 18, or by other suitable manual or power operated means. A source of high amperage current 20 is connected at one end to a spring-pressed contact 22 bearing on roll 16' and at the other end through a flexible conductor 24 to a conducting point 26 supported in an insulated handle 28. In operation, as the solder tubing passes through the rolls, the operator depresses the foot-treadle 18 for a moment to collapse a short length of tubing where the tubing is to be severed, and when the collapsed portion of tubing has progressed beyond the rolls, he touches contacting point 26 for an instant to the middle of the collapsed portion of tubing. When the point 26 is touched to the solder tubing, a circuit through the tubing is completed, and when point 26 is removed, an arc is drawn which melts the tubing to concurrently sever it and hermetically seal both severed ends. A standard one hundred and ten volt circuit is suitable as a source of current, and it is advisable to insert a resistance (not shown) in series therewith to prevent excessive amperage.

Combined cutting and soldering while maintaining pinching pressure on the solder, can be accomplished as indicated in Fig. 6, with a pair of pliers or other suitable type of press, having opposed colinear V-shaped grooves 32, 32' formed in its jaws 30, 30'. Thus, when the jaws are closed down on the solder tubing, a diamond shaped bore extends into the plier jaws transverse to the solder tubing. A soldering iron 34, the cross-section of which is similarly diamond shaped, can be slid with a free sliding fit into the diamond shaped bore between the plier jaws. In operation, the jaws 30, 30' are clamped down on the solder tubing and are maintained under pressure sufficient to collapse the tubing while the hot soldering iron is inserted into the bore formed by grooves 32, 32' to melt the length of solder tubing which bridges the openings 32, 32'. The soldering iron is withdrawn, pressure is released from jaws 30, 30', and the severed and end-sealed solder is removed therefrom. It will be understood that the foregoing apparatus is merely illustrative, and that any number of modified forms of apparatus could be directed to the same purpose.

Occasionally in process of manufacture, flux-core solder tubing may break, or for some other reason it may be necessary to join two pieces thereof together. This can be done while still leaving the flux-core hermetically enclosed, by a further development of this invention. The two pieces of flux-core solder tubing to be joined are tightly clamped and held compressed with their ends abutting between and near the outside edge of a pair of pliers or other metal press jaws. As before, the solder tubing is compressed sufficiently to close the flux-cores. Molten solder, preferably of the same composition as that of the solder tubing, is then flowed in between the abutting ends of tubing and is maintained in molten condition as by the tip of a soldering iron, until the molten solder "takes" to the two pieces of tubing to be joined. Soldering flux is used if required, but ordinarily there will be sufficient flux at the ends of the tubing being joined. Clamping pressure is not relieved until after the solder has solidified. It is advisable to flow molten solder in from both sides to form the joint, and this may either be done in two completely separate operations, or by clamping the solder tubing longitudinally between narrow jaws little wider than the diameter of the tubing and soldering from both sides with a single clamping set-up. If a lap joint is desired instead of a butt joint, the pieces of solder are clamped side by side, or preferably one on top of the other with their flattened faces overlapping, while being soldered together. This latter type of lap joint can be produced effectively by the apparatus illustrated in Fig. 4 without supplying solder from an outside source and without completely liquefying the walls of the tubing. In joining solder tubing, the two pieces of tubing can be joined without being maintained under pressure during the soldering process if the end portions of both solder tubes are first collapsed into metal to metal contact whether or not the collapsed ends are first soldered closed, but it is decidedly preferable to maintain both pieces of solder under clamping pressure during the soldering process.

It may be desirable to join the end of the flux-core solder tubing not to an end of another length of tubing, but to some other object such as the metal spool or can on or in which flux-core solder wire is customarily packaged. This can be accomplished in a manner similar to the end-joining aforedescribed; it being preferable to hold the end of the solder against the surface of the member to which it is to be joined, and to press it thereagainst with sufficient force to collapse the end of the tubing, while soldering said end to the said surface. The tubing can thus be joined to another object as desired and concurrently be hermetically sealed.

It is frequently desired to interrupt the core of flux-core solder tubing intermediate of its ends so as to isolate the flux into a series of hermetically closed cells. This may be done by cutting and joining the flux-core solder tubing as above-described wherever an interruption of the flux-core is desired. The cutting step may be eliminated by supporting a collapsed portion of the tubing as by plier or press jaws, so that the tubing will not separate when melted, and then melting the tubing at the middle of its collapsed length by means of a soldering iron or electric arc, and allowing the molten portion to solidify before removing the pliers or other support. In this process also, it is not essential completely to liquefy the contacting walls of the solder tubing. They need only be raised to hot-welding temperature, as by the apparatus illustrated in Fig. 4.

A solder tube having its ends sealed and its core isolated into separate hermetic cells is shown in Fig. 7. The end closures of Fig. 7 are identical to those of Fig. 3, and the intermediate closures 2C are similar in all respects to the closure 2C described in connection with Fig. 4.

The preferred forms of self-fluxing solder illustrated in Figs. 2, 3, 4 and 7, and each cell of that shown in Fig. 7, consists of a core of flux 4 enclosed in a completely integral enshealing casing of solder every portion of which is identical in composition.

It is emphasized that the embodiments of our invention herein disclosed are illustrative and not inclusive of all the forms our invention may assume. Certain of the objects, or certain portions or combinations of the objects of our invention may be attained with the use of less than all its advantageous component features or with modifications within its purview. It is petitioned that our invention be limited only by the claims constituting its final determination.

We claim:

1. Self-fluxing solder comprising a tube of solder, a core of flux therein, and a solid closure of fused solder formed from the material of the tube adherently and hermetically bonding said tube closed; all the solder in that portion of said self-fluxing solder which includes said closure having a melting point substantially higher than the volatilization temperature of said flux.

2. Self-fluxing solder comprising a tube of solder, a fused solder joint bonded to and integrally closing said tube, said joint being formed from the material of the tube and a core of flux in said tube and isolated from said solder joint.

3. Self-fluxing solder comprising a tube of solder, a core of flux therein; an end portion of said tube having its walls collapsed substantially to close said core; and a fused solder joint formed from the material of the tube bonded to and integrally closing the end of said tube to hermetically seal said core.

4. In a method of hermetically end-sealing flux-core solder tubing, the steps of collapsing an end portion of the walls of said tubing into metal to metal contact and then fusing the end of the tubing closed.

5. In a method of hermetically end-sealing flux-core solder tubing, the steps of removing the flux from the end portion of the tubing and then applying for a very short period of time highly localized heat sufficient to fuse the end of said tubing closed.

6. In a method of hermetically sealing flux-core solder tubing, the steps of pinching a portion of said tubing with sufficient force to collapse its walls into metal to metal contact, heating said portion of tubing to a temperature at least sufficient to weld a portion of its contacting walls into integral union and solidly closing the end of said tube by fusion.

7. In a method of hermetically end-sealing flux-core solder tubing, the steps of pinching an end portion of said tubing with sufficient force to collapse its walls into metal to metal contact and concurrently fusing the end of said tubing closed.

8. In a method of hermetically sealing flux-core solder tubing, the steps of collapsing a portion of the tubing to bring its walls into metal to metal contact, melting through to complete severance of the tubing intermediate its collapsed portion and fusing the ends of the severed portion closed.

9. In a method of end-sealing flux-core solder tubing having a normally solid flux-core, the steps of removing the flux from the end portion of the tubing, and solidly closing said end of the tubing by fusing the solder tubing.

SIDNEY L. PALMER.
LLOYD M. BECKES.